United States Patent [19]

Araki et al.

[11] Patent Number: 5,081,582
[45] Date of Patent: Jan. 14, 1992

[54] METHOD OF CONTROLLING POSITION OF ON-WATER WATER CURTAIN DEVICE

[75] Inventors: Toshimitsu Araki, Musashino; Fumihiko Kawamata, Chiba; Hitoshi Miyagawa, Kanagawa; Masahito Yoshida; Naotaka Masuda, both of Tokyo, all of Japan

[73] Assignees: Ishikawajima-Harima Heavy Industries Co., Ltd.; Tokyo Electric Power Co., Inc., both of Tokyo, Japan

[21] Appl. No.: 358,273

[22] Filed: May 26, 1989

[51] Int. Cl.$^5$ .............. G01V 1/00; B63H 25/00; E02B 15/00; E02B 15/04
[52] U.S. Cl. .............. 364/420; 114/144 E; 114/144 B; 405/60; 405/66
[58] Field of Search .............. 364/420; 114/144 E, 114/74 R, 144 B; 405/66, 60

[56] References Cited

U.S. PATENT DOCUMENTS

| | | | |
|---|---|---|---|
| 4,316,253 | 2/1982 | Possémé | 114/144 B |
| 4,511,285 | 4/1985 | Eriksson | 405/66 |
| 4,519,335 | 5/1985 | Krautkremer | 114/144 E |
| 4,532,877 | 8/1985 | Nagata et al. | 114/144 E |
| 4,664,052 | 5/1987 | Burns et al. | 114/144 E |
| 4,747,359 | 5/1988 | Ueno | 114/144 B |
| 4,889,447 | 12/1989 | Strange | 405/60 |

*Primary Examiner*—Dale M. Shaw
*Assistant Examiner*—Xuong M. Chung
*Attorney, Agent, or Firm*—Dykema Gossett

[57] ABSTRACT

A method of controlling the position of an on-water water curtain device for building a water curtain on the water in order to stop or disperse dangerous gas leaking from a ship or to block flame and radiant heat due to the leaking gas. The method comprises the steps of detecting positions of the ship and the water curtain device, detecting wind direction and tidal current, and adjusting the position of the water curtain device to an optimal position in accordance with detected values so as to maintain the diaster prevention water curtain substantially perpendicular to the leaking gas.

6 Claims, 4 Drawing Sheets

METHOD OF CONTROLLING POSITION OF ON-WATER WATER CURTAIN DEVICE

BACKGROUND OF THE INVENTION

1. Technical Field

The present invention relates to a method of controlling the position of a water curtain device of an on-water floating type, which is used for the promotion or stoppage of the diffusion of inflammable gas, poisonous gas or high-temperature gas leaking from a ship, reduction in the spread of radiant heat in the case of combustion of such inflammable gas, or the like. The present invention particularly relates to a method of controlling the position of such an on-water water curtain device so as to move the device to an optimal position in consideration of the influence of the direction of wind and the tidal current.

2. Background Art

When low-temperature, liquefied inflammable gas, such as liquefied natural gas (LNG) and liquefied petroleum gas (LPG), which is transported by a ship, leaks onto the water due to an accident such as the collision of ships, the gas diffuses through quick evaporation due to the heat of the water so that an explosion or a fire is likely to occur over a wide area. If the explosion or the fire occurs, high-temperature gas is generated. When poisonous gas, which is transported by a ship, leaks onto the water due to an accident, such as the collision of ships, and diffuses, the gas is likely to contaminate the environment or cause a human disaster. It is conceivable that a device for making a water curtain, as used for a low-temperature liquid storage facility or the like on the ground, to preclude such dangerous gas from diffusing around or exerting an influence of heat, may be floated on the water so as to be used for disaster prevention. However, if the water curtain must surround an entire ship, the device is necessarily long and large. This is undesirable from the viewpoint of the efficiency of the conveyance, disposition and so forth of the device to or at the site of an accident and the viewpoint of economy. For that reason, the water curtain device must be disposed only at the dangerous area where the gas leaks. However, there is a problem that since the position of the ship and the direction of the leak of the gas change due to the tidal current and the direction of the wind, the water curtain device needs to be moved depending on the change.

SUMMARY OF THE INVENTION

The present invention is directed toward overcoming the above-mentioned problem.

Accordingly, it is an object of the present invention to provide a method of controlling the position of an on-water water curtain device in which the diffusion of inflammable gas, poisonous gas or high-temperature gas leaking from a ship can be promoted or stopped by the device in the optimal position with the radiant heat generated in the case of combustion of the inflammable gas being reduced to prevent a disaster on the surface of water.

When the on-water curtain device provided with a moving means is to be moved to an optimal position relative to the flowing gas, the position of the ship, that of the water curtain device and the wind direction at the device are detected. The moving means is controlled on the basis of the detection signals so that the device is located at a prescribed distance leeward from the gas leak portion of the ship, and the longitudinal direction of the device is made perpendicular to the direction of the wind. The device may be buoyant members provided with thrusters or tugboats. When the buoyant members are employed, the thrusters are mounted on at least both ends of the device. The position of the ship is detected by a radar or the like. The position of the device is detected by radio distance measuring instruments or the like. The position of the device is detected by radio distance measuring instruments or the like. The direction of the wind is detected by an anemoscope or the like. The quantity and direction of the movement of the device to the optimal position by the moving means are determined on the basis of the detected positions of the ship and the device and the detected direction of the wind. The moving means is controlled in a manner such that the device is moved to a prescribed leeward position from the gas leak portion of the ship and the longitudinal direction of the device is substantially perpendicular to the wind direction, so as to completely prevent a disaster by the device of certain length. The moving means is also controlled in a manner such that a water curtain is always built at the optimal position even if the position of the ship and the direction of the flow of the gas change due to the directions of the tidal current and the wind. As a result, the promotion of the diffusion of the leaking gas and the reduction of the radiant heat thereof can be effectively performed by the on-water water curtain device which has the prescribed length and does not extend around the entire ship.

DETAILED DESCRIPTION OF THE PREFERRED EMBODIMENT

An embodiment of the present invention, comprising a method of controlling the position of an on-water water curtain device, is hereafter described in detail with reference to the drawings attached hereto.

Figure 2:
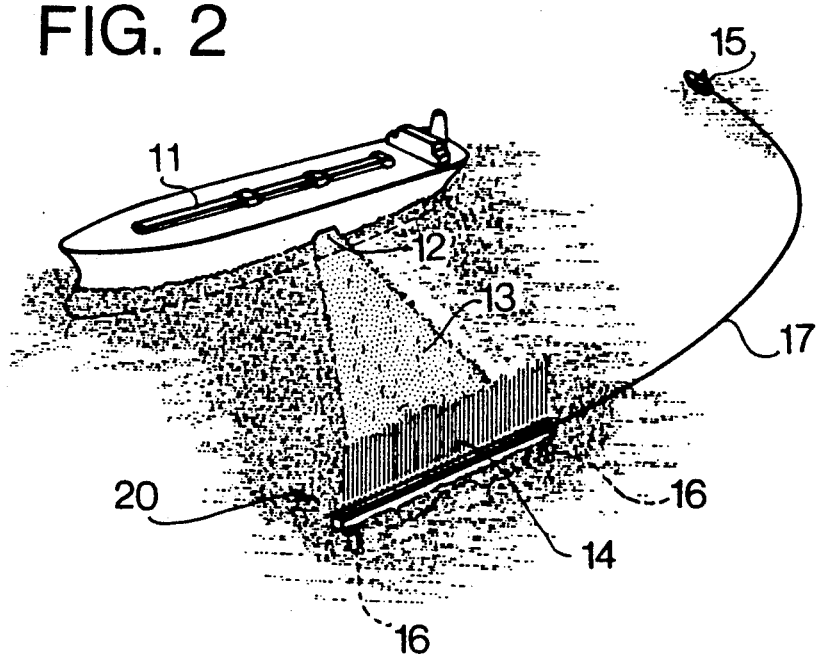
FIG. 2 is a perspective view of the device.
Figure 3:
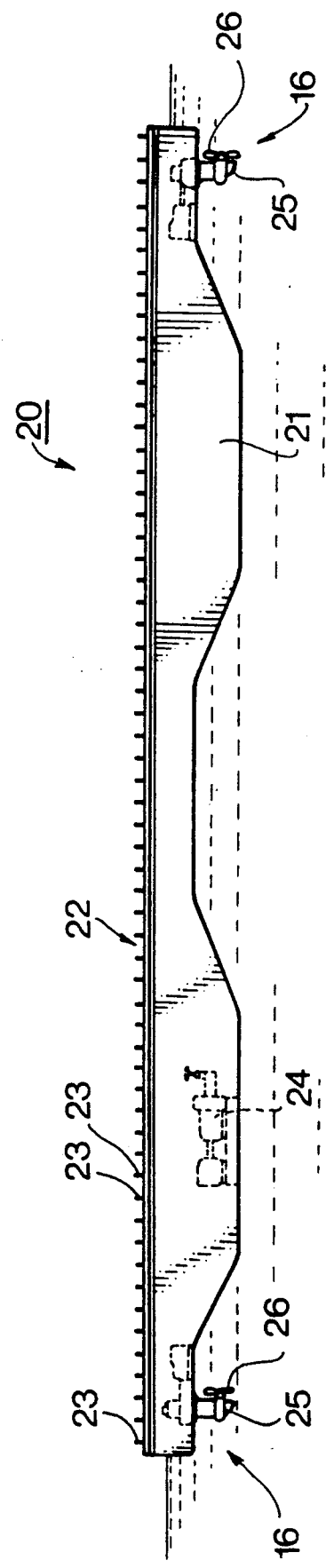
FIG. 3 is a front view of the device.

For example, the device 20 is disposed so that the longitudinal direction thereof extends perpendicularly to the direction of the flow of gas 13 leaking from the leak portion 12 of a ship 11, as shown in FIG. 2, and a water curtain 14 is formed to promote the diffusion of the gas or to block the flow of the gas to reduce the spread of the radiant heat of the gas if it is high-temperature gas. The device 20 is tugged to the site of the leak of the gas by an assisting boat 15 or is self-propelled to the site. The device 20 is provided with moving means 16 for moving the device to change the position of the water curtain 14. For example, the moving means 16 is formed by front and rear thrusters. As shown in FIG. 3, the device 20 comprises a long, sealed, explosion-proof pontoon 21 floating on the water, a water feed pipe 22 attached to the pontoon, and a large number of water curtain making nozzle units 23 attached at prescribed intervals to the pipe. A water pump 24 is provided in the pontoon 21 so that the pump can be driven by an electric motor supplied with electric power from the assisting boat 15 through a power cable 17. The thrusters 25 which constitute the moving means 16 for changing the position of the device 20 are provided at both ends of the pontoons 21. Each thruster 25 includes a propeller 26, which can be rotated around a horizontal axis by a propelling motor to make a backward stream and can be also turned, together with the shaft for the propeller, about a vertical axis by a turning motor. For that reason, the device can be moved in an arbitrary direction on the water. The length of the pontoon 21 is set at about 150 m, for example. Although the device 20 is made of the single pontoon 21 as shown in FIG. 3, the device may be made of a plurality of pontoons coupled to each other.

Figure 1:
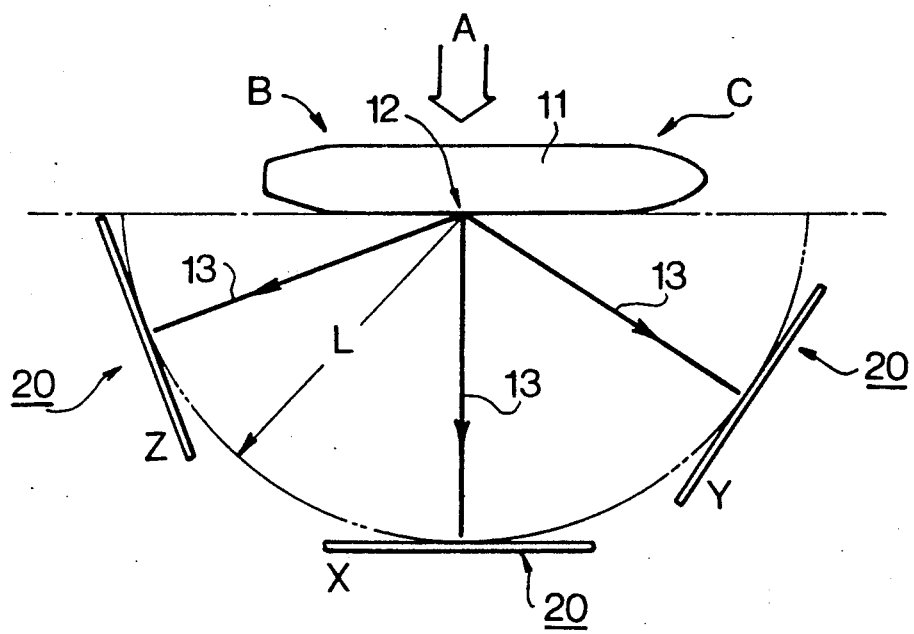
FIG. 1 is a plan view useful in explaining control of the position of an on-water water curtain device according to a method of the present invention.

A control method for causing the on-water water curtain device 20 to always effectively function is now described. The main steps of controlling the device 20 in the method are (1) keeping the device at a predetermined distance L from the leak portion 12 of the ship 11, (2) keeping the longitudinal direction of the device perpendicular to the direction of the wind, and (3) keeping the device 20 in a straight line if the device is made of a plurality of pontoons. For example, if the direction of the wind changes as shown by arrows A, B and C in FIG. 1, the device 20 is moved and put in desired positions X, Y and Z in the method.

Figure 4:
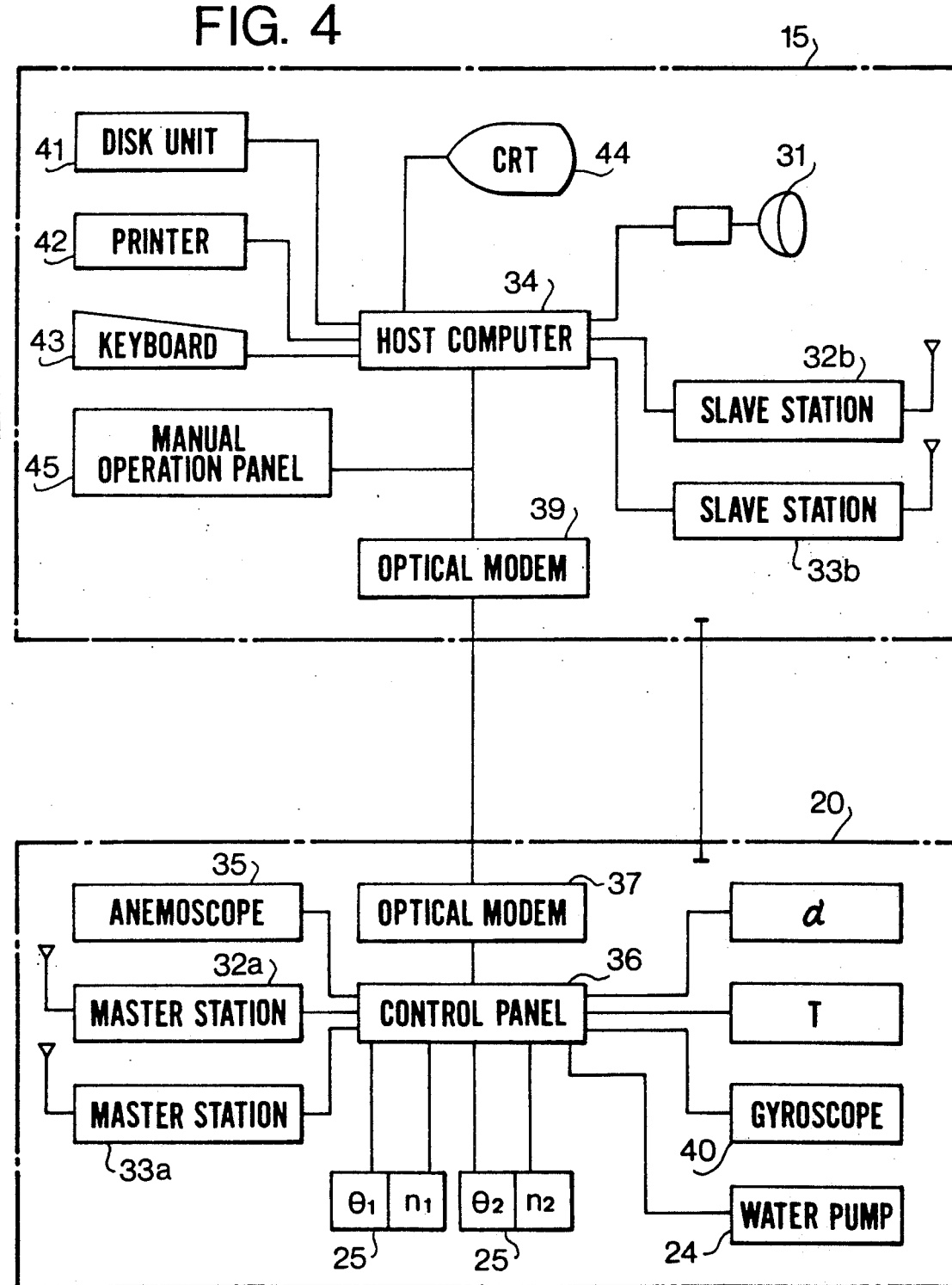
FIG. 4 is a block diagram of the controlling of an on-water water curtain device.

To achieve the control, the position of the ship 11 and that of the device 20 need to be accurately detected. The assisting boat 15 is equipped with a millimeter wave radar 31 for detecting the position of the ship 11. The master station means 32a and 33a of radio distance measuring instruments are attached to both the ends of the device 20, and the slave station means 32b and 33b of the instruments are provided on the assisting boat 15, as shown in FIG. 4. Detection signals are sent out from the radar 31 and the instruments to a host computer 34 provided on the boat 15. An anemoscope 35 is provided on the device 20 so that a detection signal is sent out from the anemoscope and converted into an optical signal that is sent to the boat 15 through an optical fiber cable 38 and is entered into the host computer 34 through an optical modem 39.

Turning angles $\theta_1$ and $\theta_2$ of the thrusters 25 are regulated by electro-hydraulic servomechanisms. The rotational frequencies $n_1$ and $n_2$ of the propellers 26 are regulated by inverters, detected through the inverters, and entered into the host computer 34 through the control panel 36.

A controller for the water pump 24 is connected to the control panel 36 to control the start and stoppage of the pump. If the device 20 is made of a plurality of pontoons, the angle $a''$ the tension T between them and the output signal form a gyroscope 40, which is for determining a criterion for angle measurement, are also entered into the control panel 36.

A disk unit 41 for storing a program or the like, a printer 42, a keyboard 43, a cathode ray tube 44 for display and a manual operation panel 45 are connected to the host computer 34 provided on the assisting boat 15, so that an interrupt instruction or the like can be entered into the host computer from the manual control panel.

Figure 5:
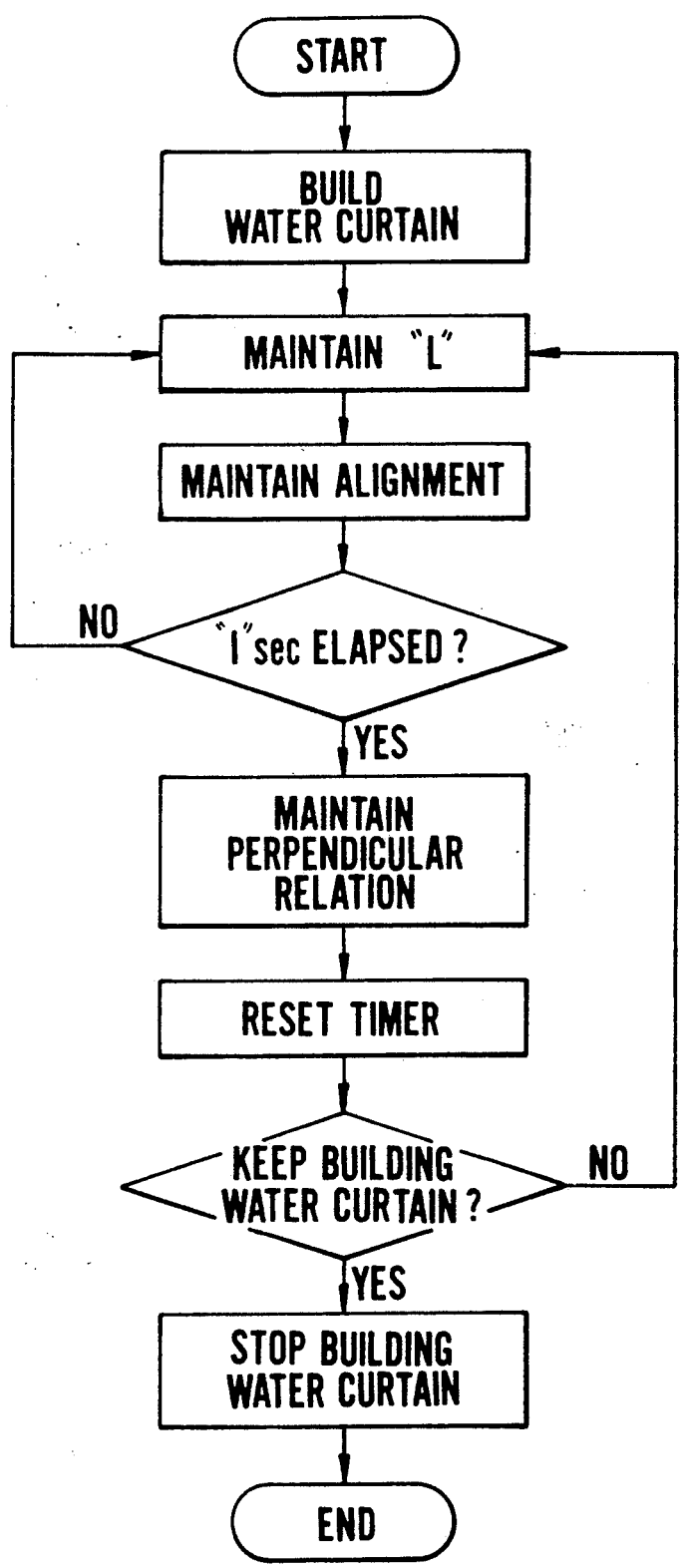
FIG. 5 is a flowchart of the controlling of an on-water water curtain device.

FIG. 5 shows a flowchart of controlling the on-water water curtain device 20 through the use of the above-described controlling equipment in the method. The start of the controlling is instructed to the host computer 34 from the keyboard 43 on the assisting boat 15 after the device 20 is moved, by itself or another, to the vicinity of the site of the leak of the gas from the ship 11. The positions of the device 20 are detected by the two radio distance measuring instruments 32a, 32b, 33a and 33b. The positions of the ship 11, which the assisting boat 15 cannot approach due to the dangerousness of the gas or the like, is detected by the radar 31. The direction of the wind is detected by the anemoscope 35. The host computer 34 acts on the basis of the detection signals from the instruments 32a, 32b, 33a and 33b, the radar 31 and the anemoscope so that the mutually relative positions of the ship 11 and the device 20 are displayed on the cathode ray tube 44 and applied to a printer 42. The host computer 34 also acts on the basis of a preset distance L entered into it from the keyboard 43, so that the turning angles $\theta_1$ and $\theta_2$ of the thrusters 25 and the rotational frequencies $n_1$ and $n_2$ of the propellers 26 are calculated to make the longitudinal direction of the device 20 perpendicular to the direction of the wind on condition that the device is at the present distance from the ship 11. As a result, the host computer 34 sends out control signals to the thrusters 25 through the control panel 36 so that the device 20 is put in a predetermined preset position. A start signal is thereafter sent out to the water pump 24 so that the water curtain 14 is built on the device 20.

After that, some control is performed so that the actual distance L between the water curtain 14 and the ship 11 is always kept constant. For the control, the actual distance L is detected from the position of the ship 11 and that of the device 20 and compared with the present distance, and that of the quantity of movement of the device, which should be performed by using the thrusters 25, is calculated by the host computer 34 to send out control signals for the turning angles $\theta_1$ and $\theta_2$ and the rotational frequencies $n_1$ and $n_2$ of the propellers 26. Although the actual distance L should be kept constant in principle, the distance may be altered if it is so short that the device 20 is likely to collide with the ship 11. As a result of the control, the device 20 and the ship 11 are kept at the preset distance L from each other even if they drift due to tidal current, the wind or the like. Therefore, the water curtain 14 functions effectively, and a secondary accident such as the collision of the device 20 with the ship 11 is prevented.

If the device 20 is made of a plurality of pontoons 21 coupled to each other, control for keeping the pontoons in a straight line is performed. To perform the control, control signals for the angle $a$ between the pontoons 21, the turning angles $\theta$ of the required thrusters 25 of the pontoons 21 and the rotation frequencies n of the required propellers 26 of the pontoons are sent out for moving the pontoons. At that time, a detection signal indicative of the tension T between the pontoons 21 is taken into consideration so as to prevent a strong force from acting on the pontoons to divide the water curtain 14.

The control for keeping the device 20 and the ship 11 at the present distance L from each other and the control for keeping the alignment of the device are repeated during a preset time I which may be 600 seconds, for example. If the wind direction and the tidal current change in a short period, the preset time I may be shortened. If the direction of the wind and the tidal current change over a long period, the preset time I may be lengthened.

Control for keeping the longitudinal direction of the device 20 perpendicular to the direction of the wind even if the direction of the wind changes after the elapse of the preset time I is performed. To perform the control, the detection signal from the anemoscope 35 and detection signals indicative of the positions of the ship 11 and the device 20 are used to make the longitudinal direction of the device perpendicular to the direction of wind that passes the gas leaking portion of the ship. For that purpose, the angle of the longitudinal direction of the device 20 relative to the wind direction is calculated by the host computer 24. The turning angle $\theta 1$ and $\theta 2$ of the thrusters 25 and the rotational frequencies n1 and n2 of the propellers 26, which are necessary to move the device 20 to equalize the calculated angle to 90°, are then calculated by the host computer 34 so that control signals for the turning angles and the rotational frequencies are sent out to perform the control.

Since the above-mentioned controls are thus performed, the longitudinal direction of the water curtain 14 is always kept perpendicular to the direction of the wind, at the preset distance L leeward from the gas leak portion 12 of the ship 11, even if the direction of the wind, the tidal current and so forth change. The controls are repeated until a timer for the control period I is reset and a work end instruction is applied. In response to the instruction, a signal for stopping the water pump 24 for making the water curtain 14 is sent out, thus terminating all the controls. If the device 20 needs to be manually operated during the controls, an interrupting instruction or the like is applied from the manual operation panel 45 on the assisting boat 15 to operate the device into a desired state.

If the gas 13 leaking from the gas leak portion 12 of the ship 11 is liquefied natural gas, the gas spreads as its gets vaporized due to the heat of the sea water, but its concentration remains probably more than 5% which is beyond the critical value. Thereupon, the device 20, whose position is controlled as described above, builds the water curtain that helps the leakage disperse upward, thereby reducing the concentration. Thus, the dangerousness due to the spill is minimized. If the gas is high-temperature gas or flames, the radiant heat thereof is effectively reduced by the water curtain 14.

Although the host computer 34 and so forth are provided on the assisting boat 15 in the above-described embodiment, the host computer and so forth may be provided on the on-water water curtain device 20 instead. Besides, the device 20, the computer 34 and so forth may be provided on the ship 11 so as to float the device on the water if an accident such as a gas leak has occurred. In that case, the ship position detection means such as the radar 31 does not need to be provided. The device 20 may be composed of floating bodies provided with moving means and a flexible water feed pipe or the like into which air or the like is supplied to apply a buoyant force to the pipe. The pontoon 21 of the device may be defined by a small boat or the like.

What is claimed is:

1. A method of controlling a position of a water curtain forming device floatable on a surface of a body of water, said device being of a type having a longitudinal axis and including means for moving the device, and distance measuring means mounted on opposite ends of the device, said method comprising the steps of:
   (A) detecting a position of a ship on the water which leaks hazardous gas;
   (B) moving the device to a position downstream of the leaking gas;
   (C) measuring a distance between the device and the ship using said distance measuring means;
   (D) inputting the distance measured in step (C) into a position controller carried on an assistant vessel;
   (E) inputting into said position controller a direction of the wind near said ship;
   (F) calculating in the controller an amount of movement of the device based on the position detected in step (A) and the distance measured in step (D) which is required to position the longitudinal axis of the device substantially perpendicular to the direction that said gas is leaking from said ship; and
   (G) controlling the moving means based on the amount of movement calculated in step (F) such that the device forms a curtain of water extending substantially perpendicular to the direction that said gas is leaking from said ship.

2. The method of claim 1, including the step of transmitting by radio communication, output signals from said distance measuring means representing the measured distance to said position controller.

3. The method of claim 1, including the step of transmitting by cable communication output signals from said distance measuring means representing the measured distance to said position controller.

4. The method of claim 1, including the steps of:
   (H) inputting to said position controller turning angles of propellers forming a part of said moving means and a speed of said device;
   (I) calculating in said position controller the distance between an actual attitude and position of the device and a desired attitude and position; and,
   (J) compensating, in said controller, for the difference calculated in step (I), based on the direction of the wind inputted into the controller in step (E).

5. A method of controlling positions of a plurality of water-based water curtain forming devices for forming a water curtain near a hazardous gas leak from a ship, each of said devices including distance measuring means at both ends thereof, an anemoscope for detecting wind direction, means for moving the device and a radio transmitter, and wherein said ship is accompanied by an assistant vessel carrying a position controller, said method comprising the steps of:
   (A) detecting a position of the leaking ship, assistant ship;
   (B) moving the devices to positions downstream of a leaking gas such that the devices are positioned at spaced apart intervals across a direction of the gas leak;
   (C) detecting a distance between the ship and the devices using said distance measuring means;
   (D) detecting a direction of the wind using said anemoscopes;
   (E) delivering to the position controller by radio transmitter the distance detected in step (C) and the wind direction detected in step (D);
   (F) calculating in said position controller and in accordance with the detected position and distance an amount of movement of each of said devices necessary to position the water curtain substantially perpendicular to a direction that the gas is leaking; and,
   (G) controlling the moving means associated with each of said devices based on the amount of movement calculated in step (F) such that the devices collectively form a water curtain extending substantially perpendicular to a direction that the gas is leaking.

6. The method of claim 5, wherein each of the moving means includes a thruster having a propeller associated with an inverter, said propeller producing a backward flow and turnable about a vertical axis, rotation frequencies of said propeller being controlled by said inverter, and said method further includes the steps of:

(H) inputting to said controller turning angle of each of the propellers and speed of each of said devices;
(I) calculating in said controller a difference between an actual attitude and position of the device and a desired attitude and position of the device;
(J) compensating in said controller for the difference calculated in step (I), taking into consideration a wind direction detected in step (D); and,
(K) determining an amount of movement of the device using said controller.

* * * * *

UNITED STATES PATENT AND TRADEMARK OFFICE
CERTIFICATE OF CORRECTION

PATENT NO. : 5,081,582

DATED : January 14, 1992

INVENTOR(S) : T. Araki, et al.

It is certified that error appears in the above-identified patent and that said Letters Patent is hereby corrected as shown below:

Column 6, line 46, insert "using the" before --assistant--.

Signed and Sealed this

Twentieth Day of April, 1993

Attest:

MICHAEL K. KIRK

*Attesting Officer*  *Acting Commissioner of Patents and Trademarks*